(12) United States Patent
Lesanko et al.

(10) Patent No.: US 9,689,383 B2
(45) Date of Patent: Jun. 27, 2017

(54) CONTROLLER FOR USE WITH A RECIPROCATING ELECTRIC SUBMERSIBLE PUMP

(71) Applicant: Rotating Right Inc., Edmonton (CA)

(72) Inventors: Michael Lesanko, Edmonton (CA); Lorne Tilby, Leduc (CA)

(73) Assignee: Rotating Right Inc., Edmonton, Alberta (CA)

( * ) Notice: Subject to any disclaimer, the term of this patent is extended or adjusted under 35 U.S.C. 154(b) by 0 days.

(21) Appl. No.: 14/727,820

(22) Filed: Jun. 1, 2015

(65) Prior Publication Data

US 2015/0349691 A1 Dec. 3, 2015

Related U.S. Application Data

(60) Provisional application No. 62/005,687, filed on May 30, 2014.

(51) Int. Cl.
| | |
|---|---|
| H02K 41/02 | (2006.01) |
| F04B 47/06 | (2006.01) |
| H02P 27/04 | (2016.01) |
| H02P 25/06 | (2016.01) |
| F04B 49/06 | (2006.01) |
| H02P 25/032 | (2016.01) |

(52) U.S. Cl.
CPC ............... *F04B 47/06* (2013.01); *F04B 49/06* (2013.01); *H02P 25/032* (2016.02); *H02P 25/06* (2013.01); *H02P 27/047* (2013.01)

(58) Field of Classification Search
CPC ...... H02P 23/02; H02P 23/0077; H02P 23/14; H02P 23/047; H02P 31/00; H02P 6/001; H02K 41/02; E21B 43/128

USPC ........ 318/37, 38, 47, 65, 135, 266, 280, 147, 318/504, 481, 503, 687, 700, 800, 801, 318/805, 807, 812, 599, 811, 437, 799; 417/1, 45, 52, 56, 44.1
See application file for complete search history.

(56) References Cited

U.S. PATENT DOCUMENTS

| | | | | |
|---|---|---|---|---|
| 5,992,517 | A * | 11/1999 | McAnally | E21B 43/121 166/105 |
| 6,414,455 | B1 * | 7/2002 | Watson | F04B 47/02 318/432 |
| 7,607,896 | B2 * | 10/2009 | Leuthen | H02H 7/1222 417/44.1 |
| 7,795,824 | B2 * | 9/2010 | Shen | F04B 47/00 318/135 |
| 8,373,952 | B2 * | 2/2013 | Mirafzal | H02M 1/12 361/45 |
| 9,148,083 | B2 * | 9/2015 | Olsson | H02P 23/0077 |
| 2013/0278183 | A1 * | 10/2013 | Liang | H02P 6/001 318/400.2 |
| 2015/0002067 | A1 * | 1/2015 | Nondahl | H02P 21/00 318/503 |

(Continued)

*Primary Examiner* — Antony M Paul
(74) *Attorney, Agent, or Firm* — Tim Liu; Liu Law Group, pllc

(57) ABSTRACT

A system and method is provided for controlling a reciprocating electric submersible pump with an AC linear motor. The system includes a programmable logic controller for controlling an inverter to provide pulse-width modulated AC power to the linear motor. Under operating conditions, a constant voltage is applied to the linear motor whose operating frequency can be controlled by the pulse-width modulation.

18 Claims, 3 Drawing Sheets

(56) References Cited

U.S. PATENT DOCUMENTS

2015/0162864 A1* 6/2015 Moghadas ............. H02M 1/32
                                                                                                      318/504

* cited by examiner

CONTROLLER FOR USE WITH A RECIPROCATING ELECTRIC SUBMERSIBLE PUMP

CROSS-REFERENCE TO RELATED APPLICATIONS

This Application claims priority to U.S. Provisional Application Ser. No. 62/005,687 entitled "Controller for Use with Reciprocating Electric Submersible Pump" filed May 30, 2014, which is hereby incorporated by reference in its entirety.

FIELD OF THE INVENTION

The present disclosure generally relates to the field of controllers for use with reciprocating electric submersible pumps ("RESP"s). More particularly, the present disclosure relates to RESPs comprising 3-phase AC electric linear motors.

BACKGROUND OF THE INVENTION

Producing wells often use a down-hole pump for pumping substances to the surface. These down-hole pumps can comprise a plunger pump or "sucker rod" pump operated by pump jacks, as well known to those skilled in the art.

A linear motor has its stator and rotor in linear motion that produces a linear force along its length. Electrical energy is converted directly into mechanical energy by the motor, with the linear reciprocating up and down motion of the motor being used to directly pump oil. Such typical linear motors are powered by direct current ("DC") power. Alternating current ("AC") powered linear motors, however, have not been used with any degree of success in operating down-hole pumps.

It is, therefore, desirable to provide a controller for controlling an AC-powered linear motor that can effectively and efficiently operate a down-hole pump for pumping substances from a well to the surface.

SUMMARY OF THE INVENTION

A system and method for controlling a reciprocating electric submersible pump ("RESP") operated by an alternating current ("AC") powered linear motor is disclosed. The controller system comprises a rectifier for rectifying a supply of AC power into direct current ("DC") power, a modulator for pulse-width modulating the DC power into pulse-width modulated ("PWM") AC power, and a controller for supplying a control signal to the modulator.

The method for controlling a RESP operated by an AC powered linear motor comprises providing a controller system which comprises a rectifier for rectifying a supply of AC power into DC power, a modulator for pulse-width modulating the DC power into PWM AC power, and a controller for supplying a control signal to the modulator, and supplying the control signal to the modulator.

In some embodiments, AC-powered linear motors may be used in conjunction with reciprocating submersible pumps for oil production in low-production wells in a rod-less pumping system. In some rod-less pumping systems, a linear motor can have its stator and rotor in a linear configuration motion that can produce a linear force along its length. A plunger pump can be combined with the linear motor into one system, with the linear motor connected directly to the plunger pump. In some embodiments, electrical energy can be converted directly into mechanical energy by the motor, with the linear reciprocating up and down motion of the motor being used to directly operate the plunger pump to pump oil from the well to the surface.

In some embodiments, linear motor controller may change the frequency of the AC current supplied to the linear motor located in the well. A reciprocating head under the influence of electrical-magnetic induction can move in a reciprocating motion and can push and pull the plunger pump accordingly to draw in and lift oil and water to ground level in a pulsing manner.

In some embodiments, the stroke length, stroke movement and time between strokes of the linear motor can be controlled by the linear motor controller. Optimization of stroke length, stroke movement and time between strokes of the pump and submersible linear motor can increase the motor's life, reliability, and performance, with a possible reduction in energy consumption.

In some embodiments, the linear motor controller may comprise a programmable logic controller ("PLC") for a 3-phase AC linear motion motor located down-hole of a reciprocating electric submersible sucker rod pump ("RESP"). The PLC may provide vector motion control to the linear motor by using a pulse width modulated ("PWM") waveform and in accordance with a custom-derived voltage to frequency curve. The motor can be coupled to the sucker rod pump, so as the controller causes the motor to reciprocate vertically, the RESP is able to pump down-hole oil and water up to the surface.

BRIEF DESCRIPTION OF THE DRAWINGS

The drawings described herein are for illustrating purposes only of selected embodiments and not all possible implementations, and are not intended to limit the scope of the present disclosure. For further understanding of the nature and objects of this disclosure reference should be made to the following description, taken in conjunction with the accompanying drawings in which like parts are given like reference materials, and wherein.

DETAILED DESCRIPTION OF THE EMBODIMENTS

Before explaining the disclosed apparatus and method in detail, it is to be understood that the system and method is not limited to the particular embodiments and that it can be practiced or carried out in various ways.

Figure 1:
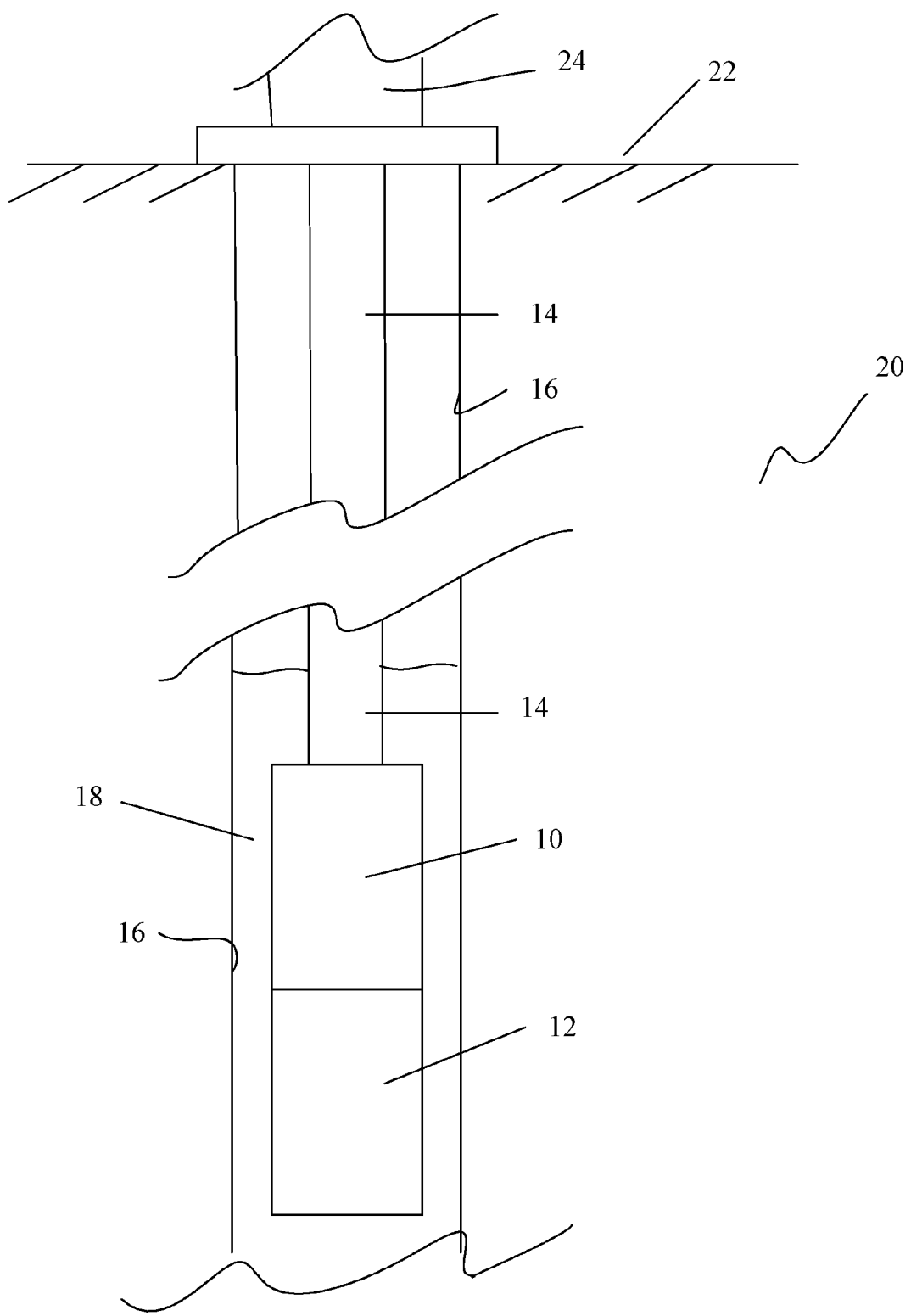
FIG. 1 is a side elevation view depicting a reciprocating electric submersible pump disposed in a well.

Referring to FIG. 1, one embodiment of RESP 10 is shown attached to tubing 14 in cased-in well 16, which is shown in formation 20. AC linear motor 12 is attached to the downhole side of RESP 10. When motor 12 is operating, RESP 10 can pump fluids 18 in well 16 up tubing 14 to surface 22 and out through wellhead 24. Even though the FIG. 1 shows only cased-in well, the present discloser may also be used in other applications.

Figure 2:
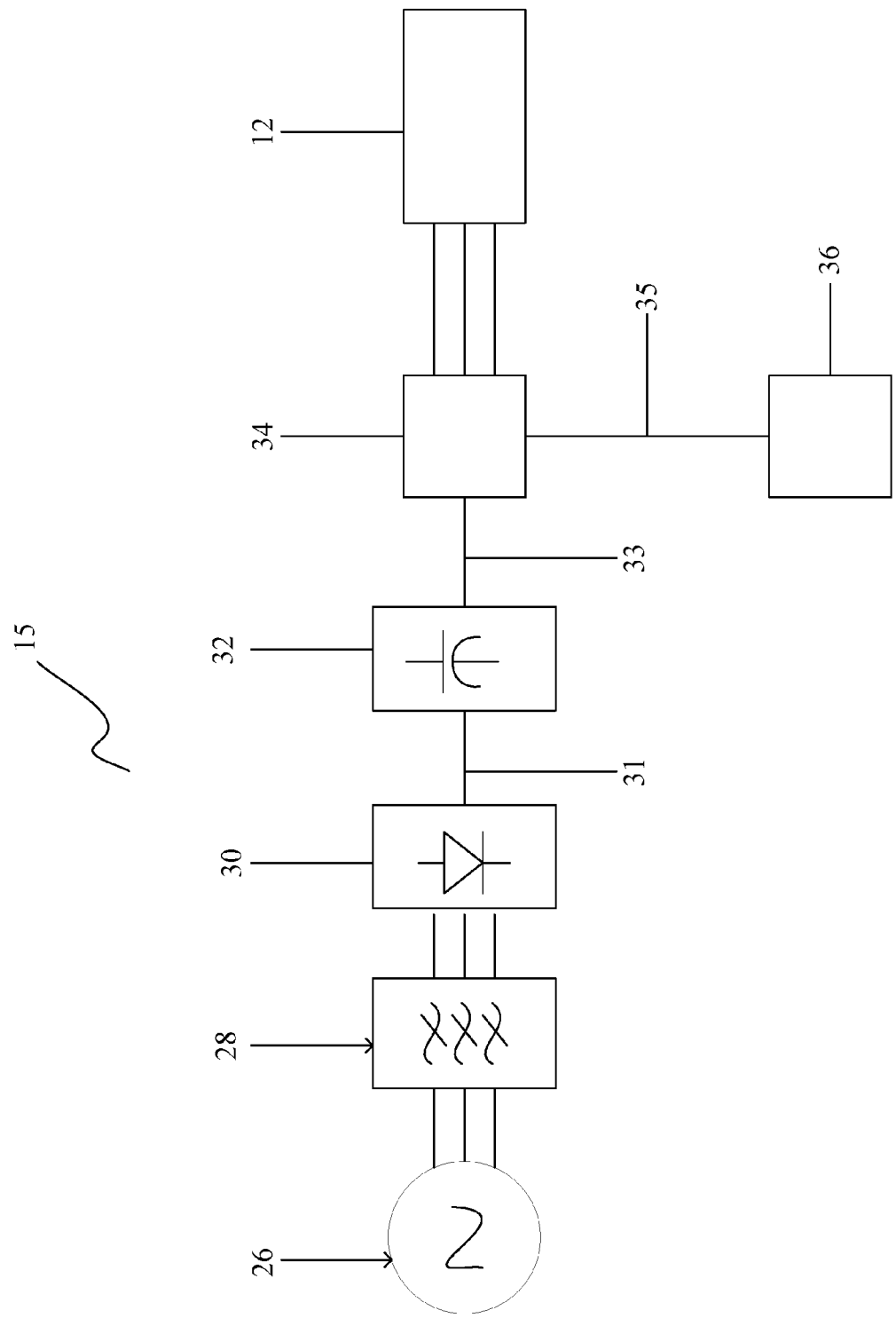
FIG. 2 is a block diagram depicting one embodiment of a system for controlling a reciprocating electric submersible pump.

Referring now to FIG. 2, one embodiment of controller system 15 is shown. In one embodiment, system 15 comprises source of 3-phase AC power 26, although single phase or other multi-phase source of power may also be used. As shown in FIG. 2, AC power 26 may be filtered by filter 28, which may then be rectified by rectifier 30 to produce DC power 31.

In one embodiment, rectifier 30 comprises a set of semiconductor devices. The semiconductor devices are configured to rectify AC power into DC power. In one embodiment, the semiconductor devices of rectifier 30 comprise one or more groups of diodes, silicon-controlled rectifiers, triacs, transistors, insulated gate bi-polar transistors, field effect transistors and metal oxide semiconductor field effect transistors.

As shown in FIG. 2, DC power 31 may then be filtered by DC filter 32 to produce filtered DC power 33. In one embodiment, DC filter 32 comprises a capacitor, a series inductor, or both.

Filtered DC power 33 powers linear motor controller 34 which powers linear motor 12, (linear motor 12 is connected to RESP 10, as shown in FIG. 1).

In one embodiment, motor controller 34 comprises a pulse-width modulator. The pulse-width modulator comprises a set of semiconductor devices comprising one or more groups of silicon-controlled rectifiers, triacs, transistors, insulated gate bi-polar transistors, field effect transistors and metal oxide semiconductor field effect transistors. The pulse-width modulator is configured to invert the DC power into the PWM AC power.

In one embodiment, programmable logic controller ("PLC") 36 is coupled to controller 34 to provide control signal 37 to controller 34 such that controller 34 may pulse-width modulate filtered DC power 33 to produce PWM AC power 35 to power linear motor 12.

In some embodiments, a specific set of instructions is programmed into the PLC from experimental data that determines a PWM waveform to control movement of the linear 3-phase AC motor with a constant voltage output and a varying frequency. In some embodiments, the instructions may be encoded in "C" programming language.

In some embodiments, the control signal 37 may be configured to control the PWM AC power supplied to the linear motor 34 whereby an operating frequency of the linear motor and a corresponding voltage of the PWM AC power supplied to the linear motor can be in accordance with a predetermined curve of the voltage versus the operating frequency.

Figure 3:
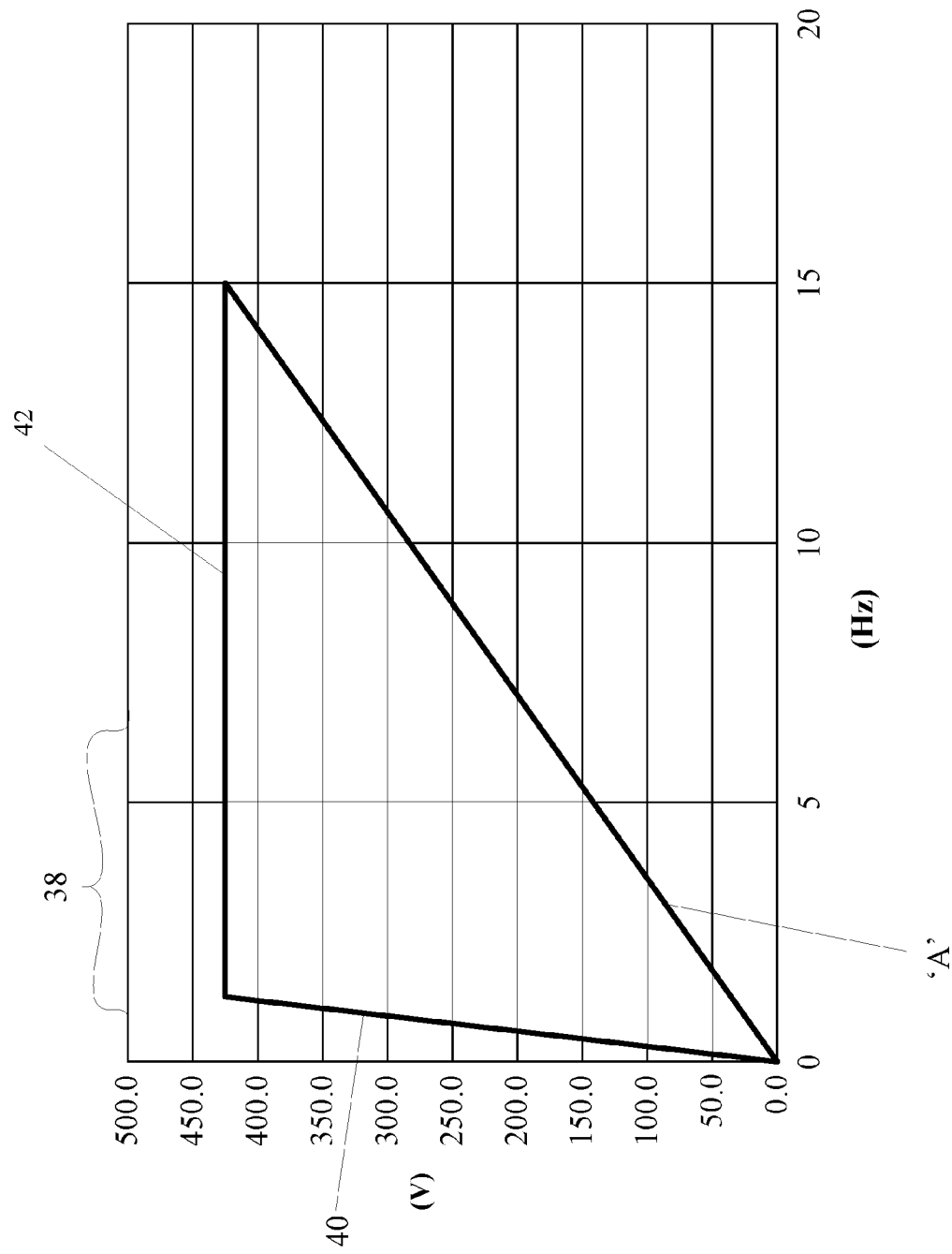
FIG. 3 is a graph depicting one embodiment of a curve of voltage versus linear motor operating frequency as carried out by the system of FIG. 2.

In some embodiments, there can be three distinct aspects to this set of instructions:

1. The Use of PWM and a Modified V/Hz Curve to Maintain a Fixed Voltage Drive for the Motor:

Typical 3-phase AC motors run at a constant or fixed volt-hertz ("V/Hz") proportion (7.67 V/Hz). Prior art controller circuits regulate the frequency of the supplied AC to the motor such that the volts are kept proportional to the hertz in order to maintain a constant and specific torque. A graphical representation of an example of this is shown as curve A, as shown in FIG. 3. In some embodiments, the linear motor controller 34 described herein does not use this method of scalar volts per hertz control; instead, the controller 34 uses a modified V/Hz curve which shows a varying frequency and fixed voltage that can be pulse-width modulated to control the speed of the motor. The PLC may allow the motor to run with a maximum voltage all of the time, aside from a short initial acceleration taking place prior to reaching maximum voltage to void the high inrush current of across-the-line starting.

2. Open-Loop Control of the Motor:

In some embodiments, the linear motor controller 34 may use open-loop control of the motor, such that the motor does not send positional information or feedback to the PLC. With a typical drive (that is, when dealing with a normal sequence and not a PWM), timers can be put into place to dictate movement of the motor in the forward or reverse direction (or, in the application of a down-hole pump, the up or down direction). If the motor stalls at either the top or the bottom of the stroke, it can knock around, so constant monitoring of the position of the motor may be required to ensure constant movement. In accordance with some embodiments, the controller 34 may, instead, incorporate a set of instruction codes (derived from experimentation and observation) programmed into the PLC to control the up/down movement of the motor, and may further allow the PLC to monitor the position of the motor, without receiving positional information from the motor itself. In some embodiments, the PLC may be programmed with specific values for height and frequency of the motor, with a known set number of current spikes occurring on the upswing and the downswing. In some embodiments, the PLC may use data from the insulated gate bi-polar transistors ("IGBTs"), disposed in the controller for supplying AC current to the motor 12, to measure the number of current spikes and, in this way, be able to monitor exactly where the motor is positioned on the upswing or downswing of its reciprocating movement. As such, positional information is received from the drive (and not the motor), and the PLC is able to monitor the motor position and control the height.

3. Increased Upstroke/Downstroke Efficiency:

In some embodiments, the controller 34 may allow for an increased number of pulses per unit of time, which may equate to increased efficiency. With typical linear motors, a constant upstroke/downstroke frequency is followed. In prior art systems, it has been observed that increasing the torque, in other words, pulling a pump load up too quickly can result in increased current supplied to the linear motor, which can cause line failures. On the other hand, it is also observed that when the pump is empty, in other words, there is no load and, therefore, reduced torque, so the motor can be dropped as fast as possible to increase efficiency without an attendant increase in current that might otherwise damage the motor. In one embodiment, the controller 34 is configured to increase the frequency on the downstroke to allow the motor to move more quickly on the downstroke. On the upstroke, there may be increased torque with a lower frequency and, therefore, increased current to allow for the upward pull or thrust of down-hole fluid on the upstroke.

In some embodiments, it is an object of the controller to reduce wear and stress on the linear motor and related components. By using PWM, the IGBTs in the controller may be switched on and off very rapidly, rather than remaining on all the time, which can stress the IGBTs resulting in early failures thereof, and which can further result in unpredictable transients that can lead to failure of the cables supplying current to the linear motor. It is a further objective to provide control of service life transients and to reduce cable failures.

In some embodiments, it is an object of the controller to increase efficiency of the linear motor by allowing the linear motor to operate quicker on the downstroke by increasing the motor frequency when there is minimum torque load thereon due to the absence of a load. Since current supplied to the linear motor during the downstroke is lower, damage to the motor may be avoided.

Referring now to FIG. 3, a graph is shown that illustrates one embodiment of the relationship between the voltage supplied to motor 12 and the operating frequency or speed of motor 12. As illustrated, in some embodiments, system 15 can operate motor 12 in accordance with a custom or predetermined voltage/frequency curve 38.

In one embodiment, the predetermined curve comprises a first linear portion 40 whereby the voltage V is proportional to the operating frequency Hz or speed of motor 12. The predetermined curve also comprises a second constant portion 42 where the voltage is constant regardless of the operating frequency or speed of motor 12.

Although a few embodiments have been shown and described, it will be appreciated by those skilled in the art that various changes and modifications can be made to these embodiments without changing or departing from their scope, intent or functionality. The terms and expressions used in the preceding specification have been used herein as terms of description and not of limitation, and there is no intention in the use of such terms and expressions of excluding equivalents of the features shown and described or portions thereof, it being recognized that the invention is defined and limited only by the claims that follow.

What is claimed is:

1. A system for controlling a reciprocating electric submersible pump ("RESP") operated by an alternating current ("AC") powered linear motor, the system comprising:
   a) means for rectifying a supply of AC power into direct current ("DC") power;
   b) means for pulse-width modulating the DC power into pulse-width modulated ("PWM") AC power, the modulating means operatively coupled to the linear motor; and
   c) means for supplying a control signal to the modulating means wherein the control signal is configured to control the modulating means to supply the PWM AC power to the linear motor;
wherein the control signal is configured for controlling the frequency of the PWM AC power supplied to the linear motor whereby the frequency of the PWM AC power is different when linear motor is moving on an upstroke than when the linear motor is moving on a downstroke.

2. The system as set forth in claim 1, wherein the rectifying means comprises a first set of semiconductor devices configured for rectifying AC power into DC power.

3. The system as set forth in claim 2, wherein the first set of semiconductor devices comprises one or more of groups of diodes, silicon-controlled rectifiers, triacs, transistors, insulated gate bi-polar transistors, field effect transistors and metal oxide semiconductor field effect transistors.

4. The system as set forth in claim 1, wherein the modulating means comprises a second set of semiconductor devices configured for inverting the DC power into the PWM AC power.

5. The system as set forth in claim 4, wherein the second set of semiconductor devices comprises one or more of groups of silicon-controlled rectifiers, triacs, transistors, insulated gate bi-polar transistors, field effect transistors and metal oxide semiconductor field effect transistors.

6. The system as set forth in claim 1, wherein the frequency of the PWM AC power on the downstroke is higher than the frequency of the PWM AC power on the upstroke.

7. The system as set forth in claim 1, wherein the control signal is configured to control the PWM AC power supplied to the linear motor whereby an operating frequency of the linear motor and a corresponding voltage of the PWM AC power supplied to the linear motor are in accordance with a predetermined curve of the voltage versus the operating frequency.

8. The system as set forth in claim 7, wherein the predetermined curve comprises a first portion whereby the voltage is proportional to the operating frequency and a second portion whereby the voltage is constant.

9. The system as set forth in claim 1, wherein the means for supplying the control signal further comprises a programmable logic controller ("PLC").

10. A method for controlling a reciprocating electric submersible pump ("RESP") operated by an alternating current ("AC") powered linear motor, the method comprising:
   a) providing a system for controlling the RESP, the system comprising:
      i. means for rectifying a supply of AC power into direct current ("DC") power,
      ii. means for pulse-width modulating the DC power into pulse-width modulated ("PWM") AC power, the modulating means operatively coupled to the linear motor, and
      iii. means for supplying a control signal to the modulating means, wherein the control signal is configured to control the modulating means to supply the PWM AC power to the linear motor;
   b) supplying the control signal to the modulating means wherein the linear motor operates;
   c) varying the voltage and frequency of the PWM AC power supplied to the linear motor; and
   d) controlling the frequency of the PWM AC power supplied to the linear motor whereby the frequency of the PWM AC power is different when linear motor is moving on an upstroke than when the linear motor is moving on a downstroke.

11. The method as set forth in claim 10, wherein the rectifying means comprises a first set of semiconductor devices configured for rectifying AC power into DC power.

12. The method as set forth in claim 11, wherein the first set of semiconductor devices comprises one or more of groups of diodes, silicon-controlled rectifiers, triacs, transistors, insulated gate bi-polar transistors, field effect transistors and metal oxide semiconductor field effect transistors.

13. The method as set forth in claim 10, wherein the modulating means comprises a second set of semiconductor devices configured for inverting the DC power into the PWM AC power.

14. The method as set forth in claim 13, wherein the second set of semiconductor devices comprises one or more of groups of silicon-controlled rectifiers, triacs, transistors, insulated gate bi-polar transistors, field effect transistors and metal oxide semiconductor field effect transistors.

15. The method as set forth in claim 10, wherein the frequency of the PWM AC power on the downstroke is higher than the frequency of the PWM AC power on the upstroke.

16. The method as set forth in claim 10, further comprising the step of controlling the PWM AC power supplied to the linear motor wherein an operating frequency of the linear motor and a corresponding voltage of the PWM AC power supplied to the linear motor are in accordance with a predetermined curve of the voltage versus the operating frequency.

17. The method as set forth in claim 16, wherein the predetermined curve comprises a first portion whereby the voltage is proportional to the operating frequency and a second portion whereby the voltage is constant.

18. The method as set forth in claim 10, wherein the means for supplying the control signal further comprises a programmable logic controller ("PLC").

* * * * *